Nov. 11, 1969  G. E. PORTER  3,477,232
BRAKE ARRESTER
Filed Feb. 14, 1968  2 Sheets-Sheet 1

INVENTOR.
GILBERT E. PORTER
BY
*Warren H. F. Schmieding*
ATTORNEY

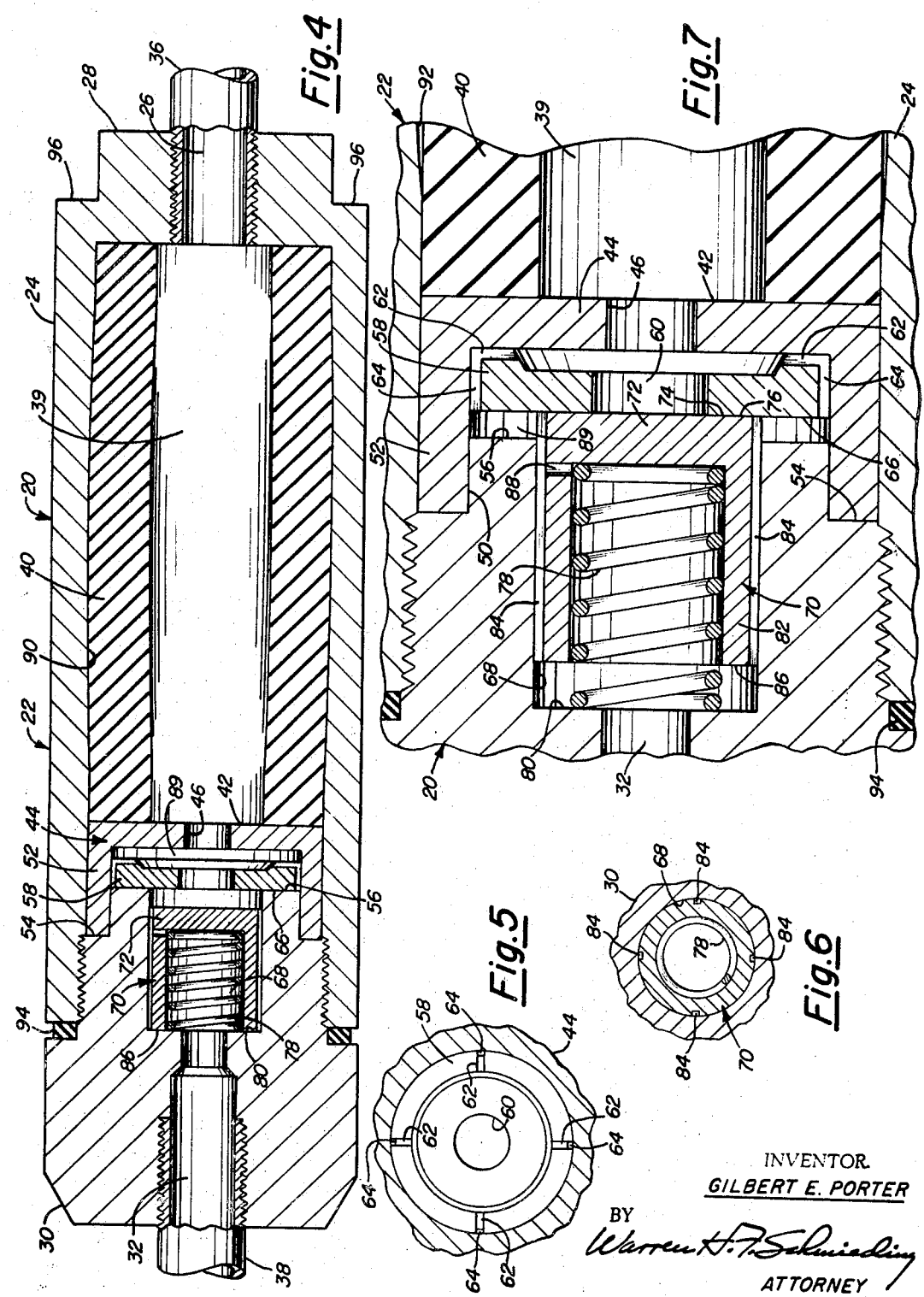

United States Patent Office 3,477,232
Patented Nov. 11, 1969

3,477,232
BRAKE ARRESTER
Gilbert E. Porter, 500 Valley Park Way, Apt. E,
Escondido, Calif. 92025
Filed Feb. 14, 1968, Ser. No. 705,346
Int. Cl. F15b *1/04, 7/00;* B60t *15/46*
U.S. Cl. 60—54.5        10 Claims

ABSTRACT OF THE DISCLOSURE

A fluid type braking system for a vehicle employing a brake arrester including valve mechanism which, after pressure, of a predetermined high value created at the master cylinder, is impressed on the brake shoe actuating mechanism, pressure in excess of that high value is prevented from being impressed on the brake shoe actuating mechanism, and the excess pressure is absorbed by an expansible and contractable chamber in the form of rubber.

BACKGROUND OF THE INVENTION

Field of the invention

The present application is directed to a braking system employing a brake arrester for the purpose of preventing the driver of a vehicle from impressing excessive pressure on the brake shoe actuating mechanism.

Description of the prior art

The closest reference known to the applicant is that disclosed in the Patent No. 3,213,624 of which applicant is the patentee. While that patent discloses absorption of excessive pressure generated through the master cylinder, and the partial suppressing of excessive pressure on the brake shoe actuating mechanism by impeding the flow of oil by the cup-shaped valve 56, nevertheless that valve permitted the flow of oil in sufficient quantity to impress too high pressure on the brake shoe actuating mechanism, when employed in the present highly sensitive brake systems.

Applicant by the present invention, not only absorbs the excessive pressure by the expansible chamber employing compressible rubber, but substantially prevents excessive pressure from being impressed on the brake shoe actuating mechanism.

SUMMARY OF THE INVENTION

In practicing the present invention, a valve, which is interposed in the conduit between the master cylinder and the brake shoe actuating mechanism is moved to a position in which it prevents excessive pressure being impressed by the master cylinder to the brake shoe actuating mechanism. Further, the invention provides for absorbing the excessive pressure of the oil by an expansible and contractable chamber, herein shown as a compressible means in the form of compressible rubber.

Other features and the advantages of the present invention will be apparent from the following description, reference being made to the accompanying drawings wherein a preferred embodiment of the invention is illustrated.

BRIEF DESCRIPTION OF THE DRAWINGS

FIG. 4 is a view similar to FIG. 1, but showing the position of valve elements when excessive pressure is being applied by the master cylinder.

FIG. 5 is a side view of a ring looking in the direction of arrows 5 of FIG. 1;

FIG. 6 is a cross section view of one of the cups, the view being taken along line 6—6 of FIG. 1; and FIG. 7 is a fragmentary view of valve elements shown in FIG. 1, but on a larger scale.

DESCRIPTION OF THE PREFERRED EMBODIMENT

Figure 1:
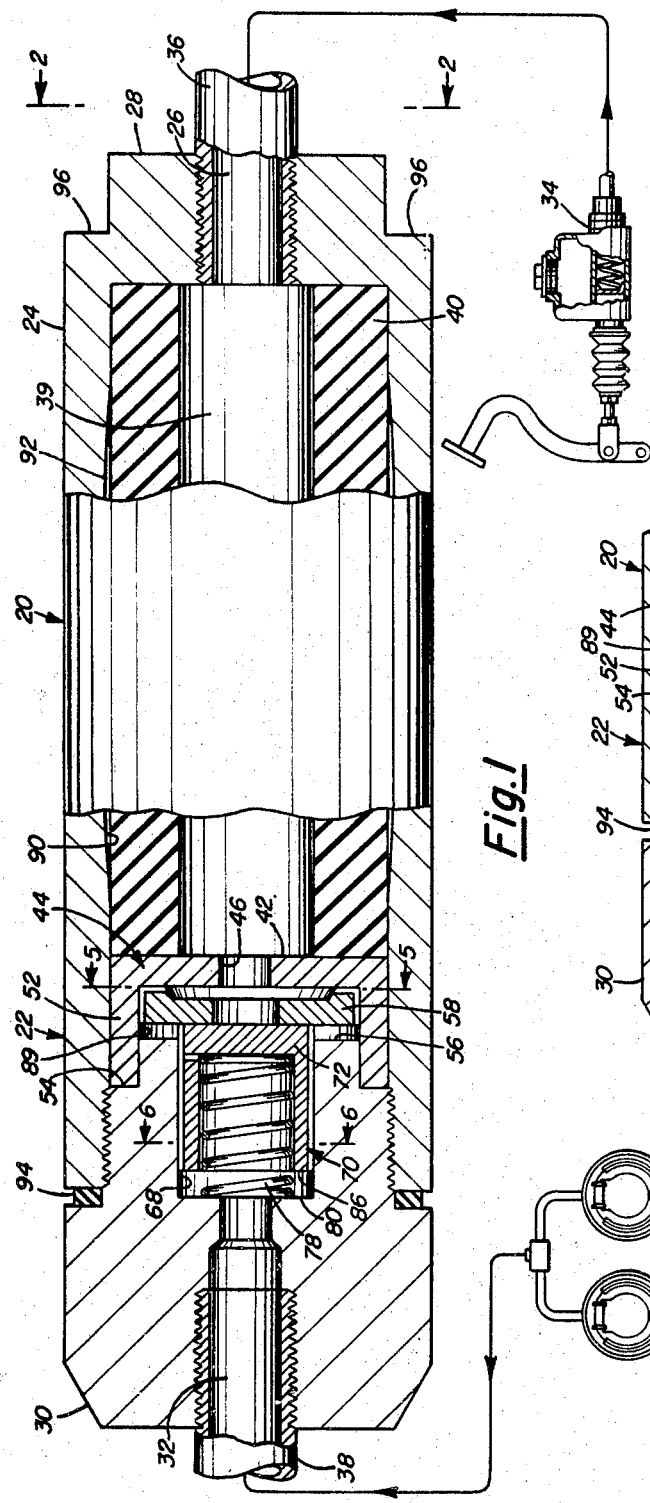
FIG. 1 is a side view of the brake arrester, part thereof being shown in section, and also showing diagrammatically a master cylinder and brake shoe actuating mechanism, the view showing the position of elements when no braking pressure is being applied by the master cylinder.
Figure 2:
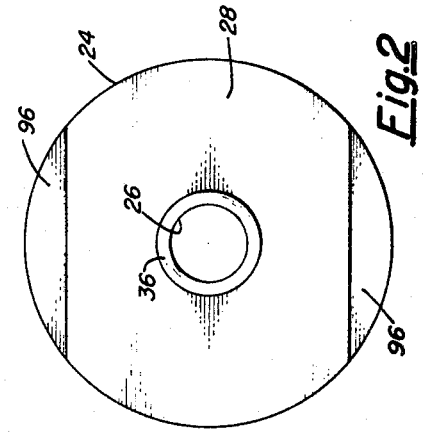
FIG. 2 is an end view of the brake arrester looking in the direction of arrow 2 of FIG. 1.

Referring more in detail to the drawings, the arrester 20 includes a casing 22 including a cylindrically shaped, elongated cup 24 having a fluid inlet passage 26 at the base end 28 thereof. The open end of the cup 24 is closed by a cap 30 which is threaded onto the cup 24. Thus, the cup 24 and cap 30 provide the casing 22. This cap is provided with an outlet passage 32. The inlet passage 26 is connected to the outlet of the master cylinder 34 by a pipe 36. The outlet passage 32 is connected to the brake shoe actuating mechanism by a pipe 38. Thus, the master cylinder, the arrester, the brake shoe actuating mechanism and the piping provide a fluid type braking system.

An expansible and contractable chamber 39 in the form of a rubber sleeve 40 is disposed within the interior of the elongated cup 24. This sleeve is flexible and compressible and has a hardness of between twenty-five and thirty shore. As viewed in the drawings, the right end of the rubber sleeve 40 abuts the base 28 of the cup 24. A base 42 of a cup 44 abuts the right end of sleeve 40 and is provided with a centrally disposed hole 46 which is aligned with the cylindrical chamber 39 in the sleeve 40. The right end of cap 30 is undercut as at 50 to receive the wall 52 of the cup 44. The radially extending, left end 54 of the undercut abuts the rim of cup 44, whereby that cup is held in position between cap 30 and the right end of rubber sleeve 40, and sleeve 40 is held in position by the base 42 of cup 44 and the base 28 of cup 24.

A ring-shaped element 58 is disposed between the inner rim of cap 30 and base 42 of cup 44. The center 60 of the ring is aligned with the opening 46 in the base 42 of the cup 44. This ring is provided with a plurality of radially extending grooves 62 on the right side thereof and with axially extending grooves 64 in the periphery thereof. The grooves 62 and 64 are interconnected so as to provide for the passage of fluid to opposite sides of the ring. The left side 66 of the ring 58 is in the form of a valve seat which is adapted to seat upon the inner rim 54 of the cap 30. Rim 54 provides a valve seat.

The right end of cap 30 is recessed to provide a cylindrical chamber 68 which is longitudinally aligned with the center 60 of the ring 58 and with the hole 46 in the base 42 of the cup 44 and longitudinally aligned with the passage 32 in the cap. A cup 70 is disposed within the chamber 68, the base 72 thereof forming a valve seat 74 at the right end thereof. This valve seat 74 is urged against a valve seat portion 76 on the left side of ring 58, the urging being by a coil spring 78. The spring is disposed on the interior of the cup 70 between the base 72 and the wall 80 which forms the left end of chamber 68. The cylindrical side wall 82 of cup 70 is provided with a series of axially extending grooves 84 and a rim 86 is in the form of a valve seat which is adapted, under a certain condition, to abut the wall 80 of the cup, said wall 80 forming a valve seat.

A bleed orifice is adapted to provide for restricted flow of fluid between the passage 32 and the area about the cup 70, and this bleed orifice is in the form of a hole 88 at the base 72 of the cup 70. This orifice has a diameter of approximately one-sixty-fourth of an inch.

Figure 3:
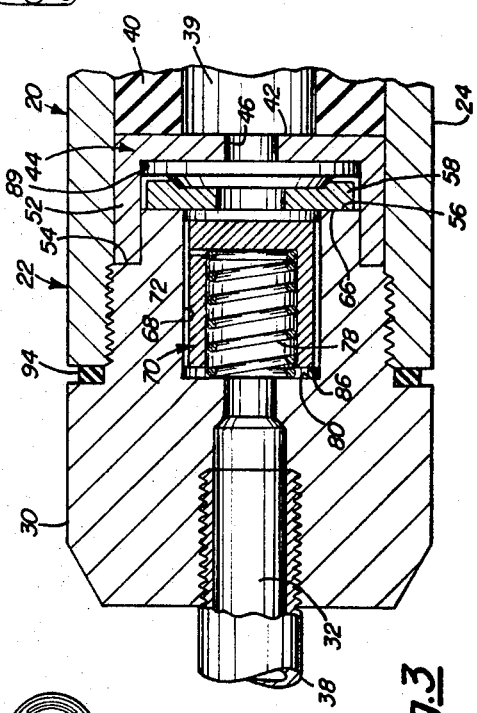
FIG. 3 is a fragmentary view showing the position of valve elements when normal braking pressure is applied by the master cylinder.

During normal braking operation, when pressure which ranges from one hundred and fifty to one hundred and seventy-five pounds per square inch is applied, the fluid in the form of oil forces the ring 58 in chamber 89 to the left, whereby the seat 66 thereof seats upon the seat 56 at the rim end of the cap 30 and the cup 70 is forced toward the left, as shown in FIG. 3, whereby fluid flows through the grooves 84 in the cup 70 into the chamber 68 and through the passage 32 in pipe 38, to the brake shoe actuating mechanisms.

Should the pressure momentarily be such that rim 86 touches wall 80 of cap 30, this pressure is immdeiately released through the bleed orifice 88 whereby the cup 70 will return to the position shown in FIG. 3. Foot pressure at the master cylinder can be released somewhat, yet the ring 58 is maintained against the seat 56, since the cylindrical cross-sectional area of the chamber 89, containing ring 58, is twice that of the chamber 68, containing the cup 70. Thus a holding braking pressure can be maintained at the brake shoe actuating mechanism which is relatively higher than that being created at the master cylinder.

Upon full release of the braking action at the master cylinder, the cup 70 will be moved to the right due to the high pressure in chamber 68 than in the master cylinder. The seat 74 on the base of cup 70 will seat against the seat 76 on the ring 58 and return the ring to the position shown in FIG. 1. Fluid can pass from the brake shoe mechanisms through the pipe 38, passage 32, chamber 68, grooves 84, chamber 56, grooves 64 in the periphery of the ring 58 and grooves 62 in the right side of ring 58, through passage 46 in the base 42 of the cup 44, passage 39 in the sleeve 40, passage 26, pipe 36 to the master cylinder 34. Spring 78 retains the cup 70 and ring 58 in the position shown in FIG. 1, although the pressure on the opposite sides of cup 70 are balanced.

When a pressure is generated by the master cylinder 34, in excess of a predetermined value, the ring 58 will be moved as aforesaid, but this pressure will cause the cup 70 to move to the extreme left position, as shown in FIG. 4, in which the rim seat 86 will seat upon the seat 80 to thereby prevent this high pressure from being imposed upon the brake shoe mechanisms. The shock of this high pressure is substantially fully absorbed by the rubber sleeve 40. If desirable, a clearance may be interposed between the periphery of the sleeve 40 and the interior of the cup 24 to provide for peripheral expansion of the rubber sleeve 40.

Under normal conditions, i.e., when the rubber sleeve is in stable condition, there is a clearance between the periphery of the sleeve 40 and the interior of the cup 24. This clearance can be formed by undercutting the periphery of the rubber sleeve or, as shown, the interior of the cup is undercut as shown at 90, the clearance being shown at 92 to form an air chamber. The ends of the sleeve are in tight abutting relationship with base 28 of cup 24 and with the left side of cup 44, and the peripheries adjacent the ends of the sleeve tightly abut the inner wall of the cup 24, whereby oil cannot seep into the air chamber 92.

The drawings, except for FIG. 7, are twice size, i.e., the overall length of the casing is four and five-eighth inches. A gasket 94 is disposed between the rim of cup 24 and the cup 30. Lands 96 are provided on cup 24 forming wrench retaining surfaces. Similar lands could be provided on the cap 30.

It will be observed from FIG. 3 that under normal braking condition when the seat of ring 58 is seated on the seat 56 of the cap, fluid cannot pass in either direction through grooves 62 and 64 of the ring 58. Therefore, it is not until the master cylinder pressure is reduced to a value sufficient to close the seat 74 of cup 70 onto seat 76 on ring 58 and push ring 58 to the left before fluid can return toward the master cylinder.

The bleed orifice 88 is disposed at the base 72 of cup 70. It provides for the escape of air that may have been contained in the cup. It is to be observed that the bleed orifice 88 also provides for releasing fluid entrapped in the brake shoe actuating mechanism. If valve seat 86 should become fastened against valve seat 80, due to malfunction of the cup 70, fluid from the brake shoe actuating mechanism can escape through orifice 86.

It has been found, in actual practice, that the braking systems now in use in vehicles, particularly where disk type brakes are employed, are highly sensitive to brake pedal operation, resulting in excessive grabbing action to the brake shoes. This excessive grabbing causes too sudden slowing of the vehicle, resulting in the passenger being thrown forwardly, excessive wearing of the brake linings, and skidding of the tires.

It has also been found, in actual practice, that when the present brake arrester is employed, the pressure applied to the brake shoe is controlled more readily whereby the too sudden slowing of the vehicle, excessive wearing of the brake linings, the throwing of passengers forwardly and skidding of the tires have been eliminated. When the seat 86 of cup 70 is forced onto the seat 80 of the cap 30, the pressure generated at the master cylinder and which is in excess of that desired or necessary, is fully absorbed by the expansible and pressure absorbing rubber sleeve 40.

It is to be understood that the word "rubber" should include also equivalent materials.

I claim:

1. A fluid type braking system for a vehicle, which braking system includes: a master cylinder, fluid actuated brake shoe actuating mechanism, and an improved valve mechanism interposed between and in cooperation with the master cylinder and the brake shoe actuating mechanism, which improved valve mechanism comprises:
   (A) a closed casing element having:
      (1) a fluid passage connectable with the master cylinder;
      (2) a fluid passage connectable with the brake shoe actuating mechanism;
      (3) a valve seat surrounding the second mentioned passage;
   (B) a movable element, said movable element having:
      (1) a valve seat adapted to rest upon the first mentioned valve seat (A)(3), said movable element being movable to seating position on the first mentioned valve seat in response to pressure in the first mentioned passage, which pressure is in excess of that necessary for normal braking action;
   (C) and means forming an expansible chamber responsive to said excess pressure and disposed in the casing intermediate the inlet to the first mentioned passage and the first mentioned valve seat.

2. A fluid type braking system as defined in claim 1, characterized in that one of said elements is provided with a bleed orifice.

3. A fluid type braking system as defined in claim 1, characterized to include:
   (D) an element forming a third valve seat in the casing between the first and second mentioned passages;
and further characterized in that the movable element (B) is provided with:
   (B)(2) another valve seat adapted to seat upon the third mentioned valve seat, said movable element being movable upon application of normal braking pressure in the first mentioned passage to cause separation of the second mentioned valve seat from the third mentioned valve seat.

4. A fluid type braking system as defined in claim 1, characterized in that the movable element is in the form of a cup, the rim thereof forming the valve seat (B)(1); and further characterized in that the bleed orifice is at the base of the cup.

5. A fluid type braking system as defined in claim 1, characterized in that the first mentioned passage extends through the fluid-compressible means and that at least part of the peripheral surface of the fluid-compressible means is spaced from the interior surface surrounding said peripheral surface when said fluid-compressible means is in stable condition.

6. A fluid type braking system as defined in claim 1, characterized in that the means (C) is in the form of a rubber container, and that the container is part of the first mentioned fluid passage.

7. A fluid type braking system as defined in claim 2, characterized in that the casing element is provided with:

(A)(4) a valve seat surrounding the movable element; and further characterized in that the third mentioned element (D) is movable upon application of normal braking pressure in the first mentioned passage, and is provided with:

(D)(1) a valve seat surrounding the third mentioned valve seat and seats upon the fifth mentioned valve seat upon application of normal braking pressure in the first mentioned passage.

8. A fluid type braking system as defined in claim 2, characterized in that the movable elements is in the form of a cup, the rim thereof forming the valve seat (B)(1) and the base thereof forming the fourth mentioned valve seat.

9. A fluid type braking system as defined in claim 7, characterized in that said elements provide a passage on opposite sides of the first mentioned movable element for the flow of braking fluid from the second mentioned passage to the first mentioned passage when the fourth mentioned valve seat seats upon the third mentioned valve seat and the sixth mentioned valve seat is spaced from the fifth mentioned valve seat.

10. A fluid type braking system as defined in claim 8, and further characterized in that the bleed orifice is at the base of the cup.

References Cited

UNITED STATES PATENTS 2,617,260   11/1952   Baldwin.
2,848,875   8/1958    Baldwin.
3,213,624   10/1965   Porter.

MARTIN P. SCHWADRON, Primary Examiner
R. R. BUNEVICH, Assistant Examiner

U.S. Cl. X.R.

60—54.6; 303—84